(12) United States Patent
Salamon

(10) Patent No.: US 10,055,270 B1
(45) Date of Patent: Aug. 21, 2018

(54) EVENT COST QUANTIFICATION SYSTEM AND METHOD

(71) Applicant: EMC IP Holding Company LLC, Hopkinton, MA (US)

(72) Inventor: Victor Salamon, Edmonton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 146 days.

(21) Appl. No.: 15/274,505

(22) Filed: Sep. 23, 2016

(51) Int. Cl.
 *G06F 11/07* (2006.01)

(52) U.S. Cl.
 CPC ...... *G06F 11/0769* (2013.01); *G06F 11/0721* (2013.01)

(58) Field of Classification Search
 CPC .............................. G06F 11/0769; G06F 11/008
 USPC .......................................................... 714/37
 See application file for complete search history.

(56) References Cited

U.S. PATENT DOCUMENTS

| | | | | |
|---|---|---|---|---|
| 7,600,007 B1* | 10/2009 | Lewis | .................... | G06Q 10/04 709/223 |
| 7,644,046 B1* | 1/2010 | Keeton | ............... | G06F 11/3409 705/1.1 |
| 7,680,635 B2* | 3/2010 | Keeton | ................. | G06F 11/008 703/2 |
| 9,806,979 B1* | 10/2017 | Felstaine | ................. | H04L 43/10 |
| 2003/0187967 A1* | 10/2003 | Walsh | ................. | H04L 41/0672 709/223 |
| 2006/0020628 A1* | 1/2006 | Huberman | ............. | G06Q 10/06 |
| 2006/0123022 A1* | 6/2006 | Bird | ................... | G06F 17/30601 |
| 2010/0218104 A1* | 8/2010 | Lewis | .................... | G06Q 10/04 715/736 |

FOREIGN PATENT DOCUMENTS

JP 2002259752 A * 9/2002

\* cited by examiner

*Primary Examiner* — Chae M Ko
(74) *Attorney, Agent, or Firm* — Mark H. Whittenberger; Heath M. Sargeant; Holland & Knight LLP

(57) ABSTRACT

A method, computer program product, and computing system for monitoring a high-availability storage system for the occurrence of a failure event from which the high-availability storage system automatically recovered. The failure event is associated with a failure event cost. A party associated with the high-availability storage system is informed of the failure event cost.

21 Claims, 3 Drawing Sheets

EVENT COST QUANTIFICATION SYSTEM AND METHOD

TECHNICAL FIELD

This disclosure relates to data storage systems and, more particularly, to the availability of data on those data storage systems.

BACKGROUND

Storing and safeguarding electronic content is of paramount importance in modern business. Accordingly, specialty hardware and methodologies may be employed to protect and distribute such electronic content. Unfortunately, such specialty hardware and methodologies may be considerably expensive. And when such specialty hardware and methodologies are operating properly, the above-described electronic content may always be available. Accordingly, the purchaser of such specialty hardware and methodologies may not realize the value of the reliability being provided by the specialty hardware and methodologies.

SUMMARY OF DISCLOSURE

In one implementation, a computer-implemented method is executed on a computing device and includes monitoring a high-availability storage system for the occurrence of a failure event from which the high-availability storage system automatically recovered. The failure event is associated with a failure event cost. A party associated with the high-availability storage system is informed of the failure event cost.

One or more of the following features may be included. Informing a party associated with the high-availability storage system of the failure event cost may include informing the party associated with the high-availability storage system that the failure event cost was saved by the high-availability storage system. Informing a party associated with the high-availability storage system of the failure event cost may include billing the party associated with the high-availability storage system for a portion of the failure event cost. Associating the failure event with a failure event cost may include determining an event type for the failure event. Associating the failure event with a failure event cost further may include determining a unit-of-time duration for the failure event and determining a per-unit-time cost for the event type. The failure event cost may include one or more of a time-based failure event cost and a fixed-based failure event cost. The failure event may include one or more of an unavailability event, and a loss event.

In another implementation, a computer program product resides on a computer readable medium and has a plurality of instructions stored on it. When executed by a processor, the instructions cause the processor to perform operations including monitoring a high-availability storage system for the occurrence of a failure event from which the high-availability storage system automatically recovered. The failure event is associated with a failure event cost. A party associated with the high-availability storage system is informed of the failure event cost.

One or more of the following features may be included. Informing a party associated with the high-availability storage system of the failure event cost may include informing the party associated with the high-availability storage system that the failure event cost was saved by the high-availability storage system. Informing a party associated with the high-availability storage system of the failure event cost may include billing the party associated with the high-availability storage system for a portion of the failure event cost. Associating the failure event with a failure event cost may include determining an event type for the failure event. Associating the failure event with a failure event cost further may include determining a unit-of-time duration for the failure event and determining a per-unit-time cost for the event type. The failure event cost may include one or more of a time-based failure event cost and a fixed-based failure event cost. The failure event may include one or more of an unavailability event, and a loss event.

In another implementation, a computing system includes a processor and a memory system configured to perform operations including monitoring a high-availability storage system for the occurrence of a failure event from which the high-availability storage system automatically recovered. The failure event is associated with a failure event cost. A party associated with the high-availability storage system is informed of the failure event cost.

One or more of the following features may be included. Informing a party associated with the high-availability storage system of the failure event cost may include informing the party associated with the high-availability storage system that the failure event cost was saved by the high-availability storage system. Informing a party associated with the high-availability storage system of the failure event cost may include billing the party associated with the high-availability storage system for a portion of the failure event cost. Associating the failure event with a failure event cost may include determining an event type for the failure event. Associating the failure event with a failure event cost further may include determining a unit-of-time duration for the failure event and determining a per-unit-time cost for the event type. The failure event cost may include one or more of a time-based failure event cost and a fixed-based failure event cost. The failure event may include one or more of an unavailability event, and a loss event.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
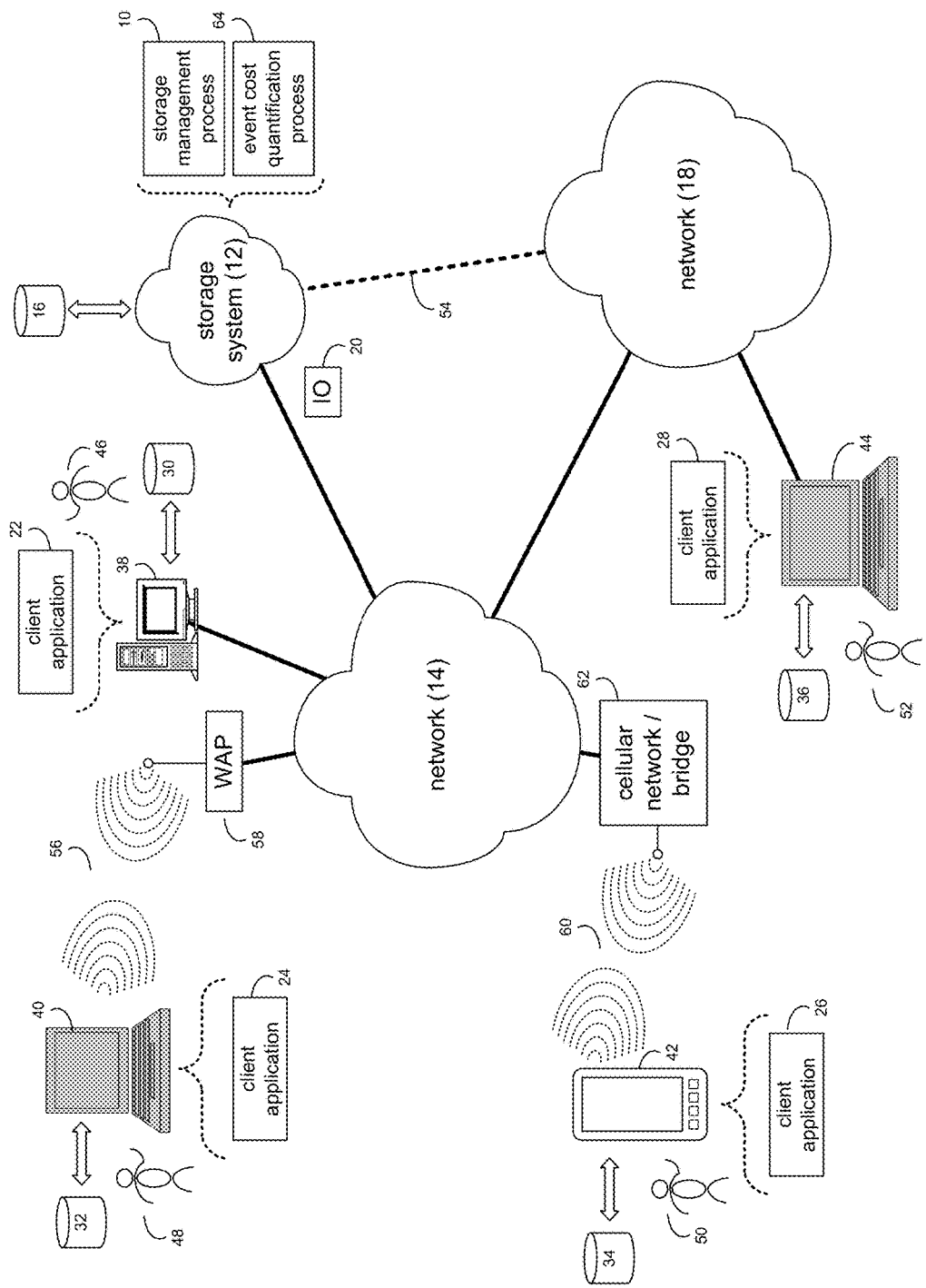
FIG. 1 is a diagrammatic view of a storage system, an event cost quantification process and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
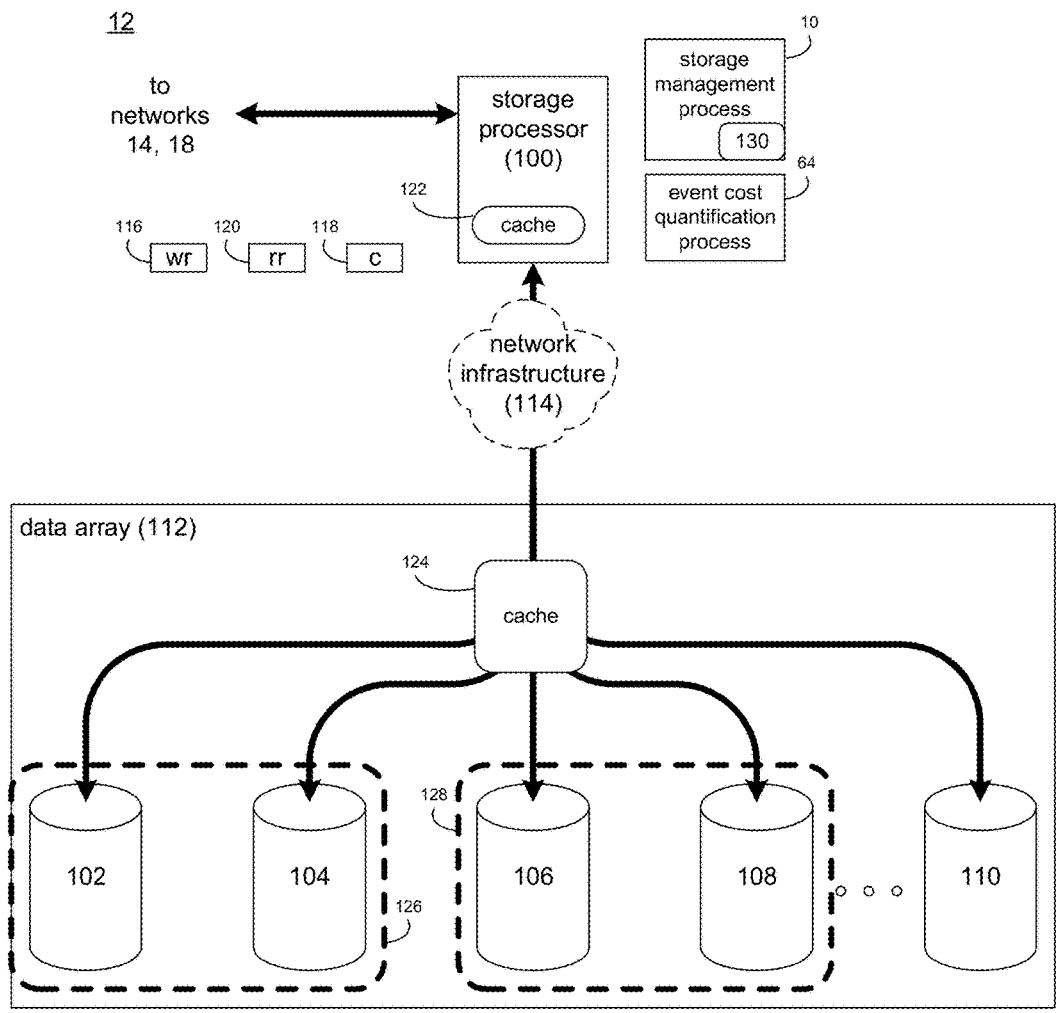
FIG. 2 is a diagrammatic view of the storage system of FIG. 1.

Data Storage System:

Referring also to FIG. 2, there is shown a general implementation of storage system 12. In this general implementation, data storage system 12 may include storage processor 100 and a plurality of storage targets (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5, RAID 6 or RAID 7 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data, wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage device.

Examples of storage targets 102, 104, 106, 108, 110 may include one or more electro-mechanical hard disk drives and/or solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, 110.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Event Cost Quantification Process:

Storage system 12 may execute all or a portion of event cost quantification process 64. Event cost quantification process 64 may be configured to illustrate to the owner/user of storage system 12 the savings that they are experiencing through the use of storage system 12. For the following example, assume that data array 112 is configured in a two-leg RAID 1 (i.e., mirrored) array, wherein: first leg 126 includes storage targets 102, 104; second leg 128 includes storage targets 106, 108; and storage target 110 is configured as a hot spare. Accordingly and during normal operation, data (e.g., content 118) may be written to first leg 126 of data array 112, wherein this content is immediately mirrored to second leg 128 of data array 112. And in the event that one of storage targets 102, 104, 106, 108 fails, the hot spare (e.g., storage target 10) may be used to rebuild the mirror. For example, if storage target 102 fails, second leg 128 may take over as the primary leg of data array 112; failed storage target 102 may be removed from first leg 126 and storage target 110 may be added to first leg 126. Now that first leg 126 (now including storage targets 104, 110) is once again healthy, first leg 126 may be rebuilt by copying the data from second leg 128 to first leg 126. As this process is automated by storage management process 10, there is no data loss, there is no performance reduction, and there is no data unavailability.

Conversely and if the data (e.g., content 118) had been stored on a single hard disk drive (e.g., storage target 102) and storage target 102 had failed, at best that data (e.g., content 118) would be unavailable until a new storage target is installed and a restoration was made from a backup. And in the event that a backup is not available, the data (e.g., content 118) may be lost.

Figure 3:
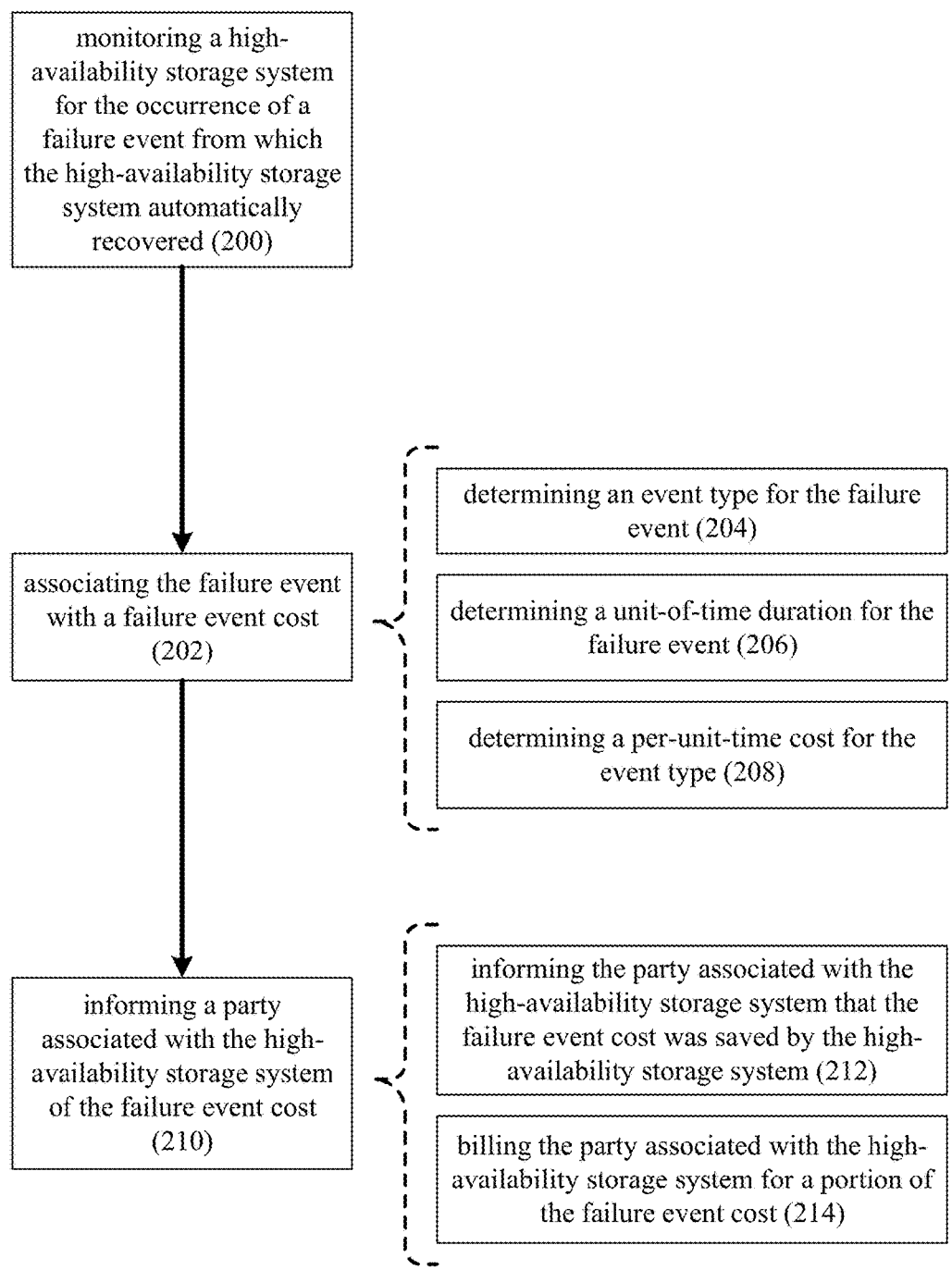
FIG. 3 is a flow chart of the event cost quantification process of FIG. 1.

Referring also to FIG. 3 and continuing with the above-stated example in which data array 112 is configured as a two-leg RAID 1 (i.e., mirrored) array, event cost quantification process 64 may monitor 200 a high-availability storage system (e.g., storage system 12) for the occurrence of a failure event from which the high-availability storage system (e.g., storage system 12) automatically recovered. For example, API 130 (i.e., application program interface) of event cost quantification process 64 may be employed within e.g., storage management process 10 to monitor 200 the operations of storage system 12 to detect the occurrence of a failure event from which the high-availability storage system (e.g., storage system 12) automatically recovered.

Examples of such failure events may include but are not limited to an data unavailability event and a data loss event. An unavailability event is an event in which the data (e.g., content 118) is unavailable for a defined period of time and then subsequently becomes available after e.g., a restore procedure or a rebuild procedure. A loss event is an event in which the data (e.g., content 118) has been lost and cannot be restored.

Continuing with the above-stated example, the failure event detected would be the loss of first leg 126 of data array 112 due to the failure of storage target 102. Event cost quantification process 64 may associate 202 the failure event (e.g., the loss of first leg 126 of data array 112) with a failure event cost, wherein the failure event cost may include one or more of a time-based failure event cost (e.g., a per minute unavailability cost) and a fixed-based failure event cost (e.g., a fixed fee lost data cost).

When associating 202 the failure event (e.g., the loss of first leg 126 of data array 112) with a failure event cost, event cost quantification process 64 may determine 204 an event type for the failure event. When determining 204 the event type, event cost quantification process 64 may determine what would have happened if storage system 12 was not installed. For example and through the use of storage system 12, the damaged leg of the mirror was automatically repaired by replacing failed storage target 102 with storage target 110 (i.e., the hot spare). Assume that prior to having storage system 12 installed, the data (e.g., content 118) was stored on a server having a single hard disk drive, where the data (e.g., content 118) was backed up onto a tape-based backup system. Accordingly and in the event that storage system 12 had not been installed, data would not have been lost but it would have been inaccessible for a defined period of time.

Further and when associating 202 the failure event (e.g., the loss of first leg 126 of data array 112) with a failure event cost, event cost quantification process 64 may determine 206 a unit-of-time duration for the failure event and determine 208 a per-unit-time cost for the event type (e.g., the loss of first leg 126 of data array 112).

This unit-of-time duration may be calculated in various ways and the following two scenarios are for illustrative purposes only and are not intended to be a limitation for this disclosure. For example, event cost quantification process 64 may determine 206 a unit-of-time duration that is equal to the amount of time that passed from when e.g., storage unit 102 failed until the time when storage system 12 was fully operational (e.g., the sum of the time to reconfigure first leg 126 to replace failed storage target 102 with storage target 110 and the time required to rebuild first leg 126 by copying the content of second leg 128. Alternatively, event cost quantification process 64 may determine 206 a unit-of-time duration that is equal to the amount of time that it would have taken to swap out the failed single hard drive in the old system (e.g., prior to the installation of storage system 12) and restore the data from the backup tape. Assume for this example that event cost quantification process 64 determines 206 a unit-of-time duration of 123 minutes.

The per-unit-time cost for the event type may vary greatly depending upon the type of business that is using storage system 12 or the type of application being used within a particular business. For example, if storage system 12 is used to back up data from another system, the per-unit-time cost of having storage system 12 unavailable may be comparatively inexpensive (e.g., $10 per minute). However, if storage system 12 is used to effectuate securities trading, the per-unit-time cost of having storage system 12 unavailable may be quite expensive (e.g., $10,000 per minute). Further, if another application within the securities trading business performs more mundane tasks, such as writing data to a log file, the per-unit-time cost for such an application may be significantly less than the $10,000 per minute cost of their trading application. Assume for this example that event cost quantification process 64 determines 208 a per-unit-time cost of $5,000 per minute for this event type (e.g., the loss of first leg 126 of data array 112).

Accordingly, event cost quantification process 64 may associate 202 the failure event (e.g., the loss of first leg 126 of data array 112) with a failure event cost of $615,000 (i.e., 123 minutes×$5,000/minute)

Event cost quantification process 64 may inform 210 a party (e.g., an administrator or an owner) associated with the high-availability storage system (e.g., storage system 12) of the failure event cost (i.e., $615,000).

When informing 210 a party (e.g., an administrator or an owner) associated with the high-availability storage system (e.g., storage system 12) of the failure event cost (i.e., $615,000), event cost quantification process 64 may inform 212 the party associated with the high-availability storage system that the failure event cost (i.e., $615,000) was saved by the high-availability storage system (e.g., storage system 12). For example, the administrator or owner may be informed that storage system 12 saved them from incurring a $615,000 loss (which may justify some or all of the cost of storage system 12).

Alternatively/additionally, when informing 210 a party (e.g., an administrator or an owner) associated with the high-availability storage system (e.g., storage system 12) of the failure event cost (i.e., $615,000), event cost quantification process 64 may bill 214 the party associated with the high-availability storage system for a portion of the failure event cost. For example and in certain situations, the cost of storage system 12 may be discounted and e.g., the administrator or owner may agree to pay a portion of their savings realized by using storage system 12. Accordingly and in the event of a failure event, the owner/administrator may be billed for 10% of the amount of the loss that storage system 12 prevented (e.g., 10% of $615,000).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
monitoring a high-availability storage system for the occurrence of a failure event from which the high-availability storage system automatically recovered;
associating the failure event with a failure event cost;
informing a party associated with the high-availability storage system of the failure event cost.

2. The computer-implemented method of claim 1 wherein informing a party associated with the high-availability storage system of the failure event cost includes:
informing the party associated with the high-availability storage system that the failure event cost was saved by the high-availability storage system.

3. The computer-implemented method of claim 1 wherein informing a party associated with the high-availability storage system of the failure event cost includes:

billing the party associated with the high-availability storage system for a portion of the failure event cost.

4. The computer-implemented method of claim 1 wherein associating the failure event with a failure event cost includes:

determining an event type for the failure event.

5. The computer-implemented method of claim 4 wherein associating the failure event with a failure event cost further includes:

determining a unit-of-time duration for the failure event; and determining a per-unit-time cost for the event type.

6. The computer-implemented method of claim 1 wherein the failure event cost includes one or more of a time-based failure event cost and a fixed-based failure event cost.

7. The computer-implemented method of claim 1 wherein the failure event includes one or more of an unavailability event and a loss event.

8. A computer program product residing on a non-transitory computer readable medium having a plurality of instructions stored thereon which, when executed by a processor, cause the processor to perform operations comprising:

monitoring a high-availability storage system for the occurrence of a failure event from which the high-availability storage system automatically recovered;

associating the failure event with a failure event cost;

informing a party associated with the high-availability storage system of the failure event cost.

9. The computer program product of claim 8 wherein informing a party associated with the high-availability storage system of the failure event cost includes:

informing the party associated with the high-availability storage system that the failure event cost was saved by the high-availability storage system.

10. The computer program product of claim 8 wherein informing a party associated with the high-availability storage system of the failure event cost includes:

billing the party associated with the high-availability storage system for a portion of the failure event cost.

11. The computer program product of claim 8 wherein associating the failure event with a failure event cost includes:

determining an event type for the failure event.

12. The computer program product of claim 11 wherein associating the failure event with a failure event cost further includes:

determining a unit-of-time duration for the failure event; and determining a per-unit-time cost for the event type.

13. The computer program product of claim 8 wherein the failure event cost includes one or more of a time-based failure event cost and a fixed-based failure event cost.

14. The computer program product of claim 8 wherein the failure event includes one or more of an unavailability event and a loss event.

15. A computing system including a processor and memory configured to perform operations comprising:

monitoring a high-availability storage system for the occurrence of a failure event from which the high-availability storage system automatically recovered;

associating the failure event with a failure event cost;

informing a party associated with the high-availability storage system of the failure event cost.

16. The computing system of claim 15 wherein informing a party associated with the high-availability storage system of the failure event cost includes:

informing the party associated with the high-availability storage system that the failure event cost was saved by the high-availability storage system.

17. The computing system of claim 15 wherein informing a party associated with the high-availability storage system of the failure event cost includes:

billing the party associated with the high-availability storage system for a portion of the failure event cost.

18. The computing system of claim 15 wherein associating the failure event with a failure event cost includes:

determining an event type for the failure event.

19. The computing system of claim 18 wherein associating the failure event with a failure event cost further includes:

determining a unit-of-time duration for the failure event; and determining a per-unit-time cost for the event type.

20. The computing system of claim 15 wherein the failure event cost includes one or more of a time-based failure event cost and a fixed-based failure event cost.

21. The computing system of claim 15 wherein the failure event includes one or more of an unavailability event and a loss event.

* * * * *